United States Patent [19]

Frank

[11] 4,346,734
[45] Aug. 31, 1982

[54] LOCKING DEVICE

[75] Inventor: John H. Frank, New Philadelphia, Ohio

[73] Assignee: The Warner & Swasey Company, Cleveland, Ohio

[21] Appl. No.: 203,087

[22] Filed: Nov. 3, 1980

[51] Int. Cl.³ .............................................. F16K 17/06
[52] U.S. Cl. ................................. 137/506; 29/526 R; 137/512; 411/87; 411/92; 411/121
[58] Field of Search ...................... 29/407, 525, 526 R; 137/506, 512; 411/86, 87, 90, 91, 92, 95, 97, 119, 120, 121

[56] References Cited

U.S. PATENT DOCUMENTS

| 490,553 | 1/1893 | Grafflin | 411/121 X |
| 720,769 | 2/1903 | Woodworth | 411/97 |
| 1,099,292 | 6/1914 | Gibbs | 411/95 |
| 3,319,691 | 5/1967 | Fisher | 411/90 X |

Primary Examiner—Gerald A. Michalsky
Attorney, Agent, or Firm—Howard G. Massung

[57] ABSTRACT

A locking device to keep two spaced apart positionable heads in place. The disclosed locking device can keep two hex shaped adjustable relief valve heads (34,44) in place. The locking device (10) is punched out of a flat thin sheet metal plate. An elongated opening (12) punched out in the plate has a length (14) which is greater than the furthest separation of the two adjustable heads (34,44). The in flat width (16) of the elongated opening (12) in the sheet metal plate is large enough to fit over the adjustable heads. During use, the plate is bent to decrease the effective width of the opening (12) so that it is smaller than the associated adjustable heads. The locking device (10) is then forced over the two heads (34,44) to engage a flat portion thereof and prevent relative movement.

5 Claims, 8 Drawing Figures

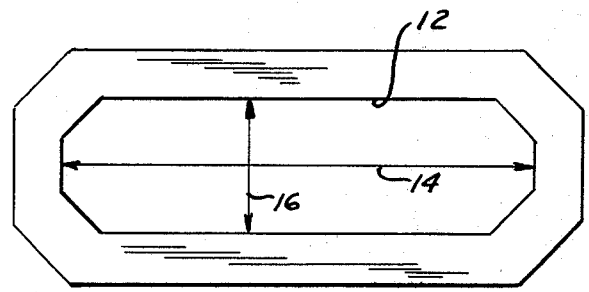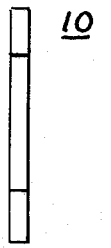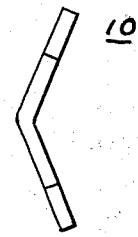
FIG.1  FIG.2  FIG.3
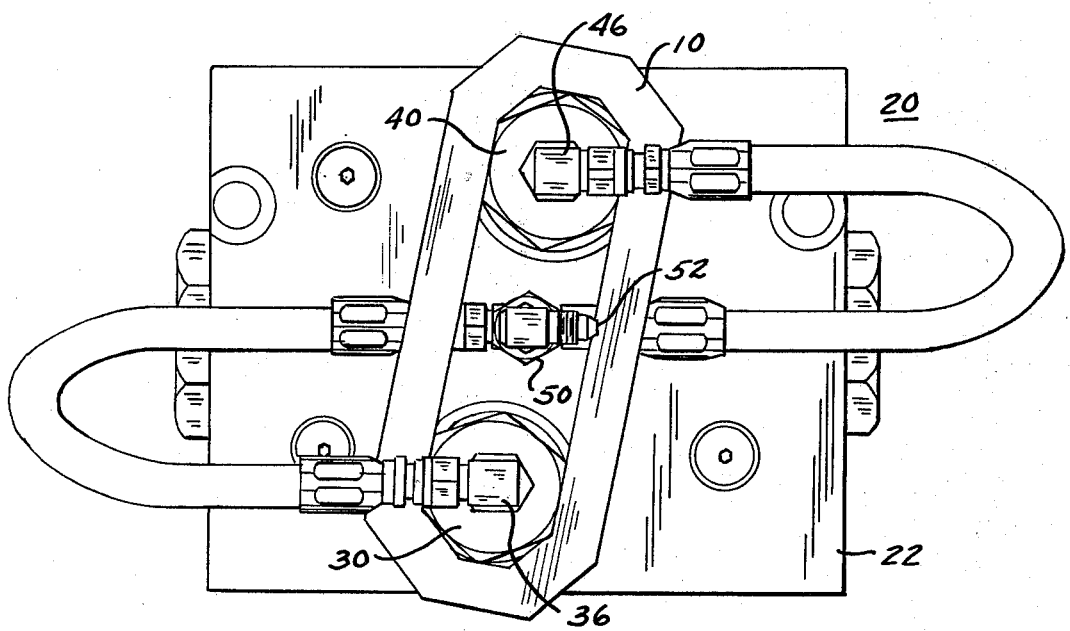
FIG.4

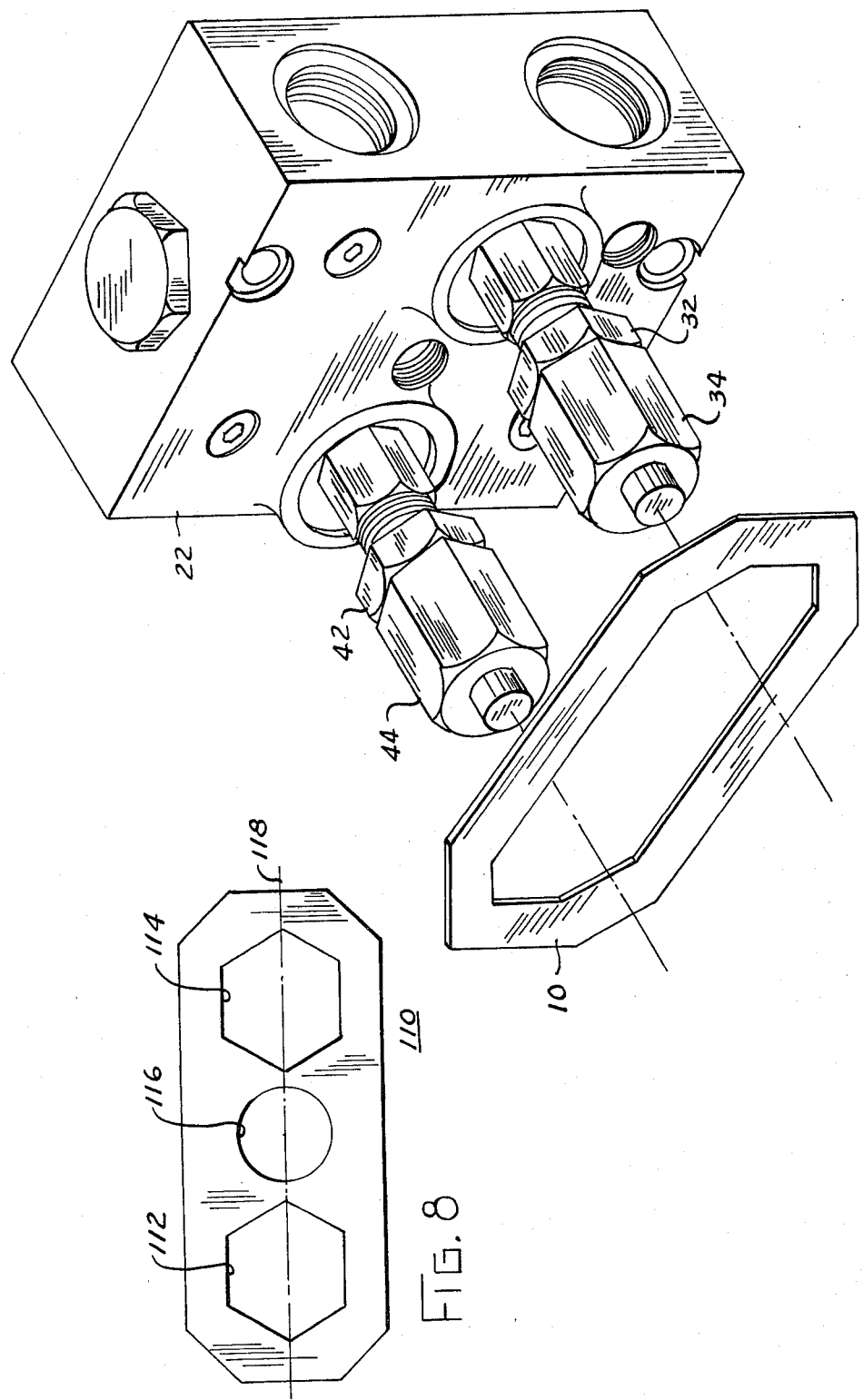

LOCKING DEVICE

BACKGROUND OF THE INVENTION

1. Technical Field

This invention relates to locking devices and more particularly to a device for locking two spaced apart adjustable headed members against relative movement.

2. Background Art

Locknuts and lockwashers have long been utilized to prevent adjustable members from working loose. However, in an environment having high vibration, shock, and oil pulsation, such as a valve assembly located on a hydraulic excavator, problems have been experienced with adjustable members working loose.

DISCLOSURE OF THE INVENTION

The present invention provides an inexpensive locking device for engaging and keeping two spaced apart adjustable headed members in place. The disclosed locking device is easy and inexpensive to form from sheet metal and can quickly be assembled to the spaced apart heads on adjustable members. The disclosed locking device is punched out of a thin sheet metal plate and has an elongated shape with an elongated opening formed therein. The length of the elongated opening is longer than the maximum outer separation of the spaced apart heads. The width of the elongated opening is large enough to fit over the adjustable heads. The locking device has two relatively long side portions which are joined by two end portions. When installed, the long sides engage flat portions on the adjustable heads to prevent relative movement.

Before installation, the sheet metal locking device is bent along its longitudinal axis to reduce the effective width of the elongated opening to a size smaller than the adjustable heads. That is, when the locking device is bent the separation between the long side portion is made smaller than the width of the adjustable heads. The locking device is then forced over the adjustable heads with the long sides engaging flat portions on the adjustable heads to prevent relative movement. By tying the adjustable heads together with the locking device, they are mechanically stopped from loosening.

BRIEF DESCRIPTION OF THE DRAWINGS

For a better understanding of the invention, reference may be had to the preferred embodiment exemplary of the invention shown in the accompanying drawings in which:

FIG. 1 is a top view of the locking device constructed according to the present invention;

FIG. 2 is a side view, in the flat, of the locking device shown in FIG. 1;

FIG. 3 is a side view of the locking device, shown in FIG. 2, bent along its longitudinal axis;

FIG. 4 is a plan view of the apparatus of FIG. 5;

FIG. 7 is a partially exploded view of a valve assembly without the locking device installed; and, FIG. 8 is another embodiment of a locking device constructed according to the present invention.

BEST MODE FOR CARRYING OUT THE INVENTION

Figure 5:
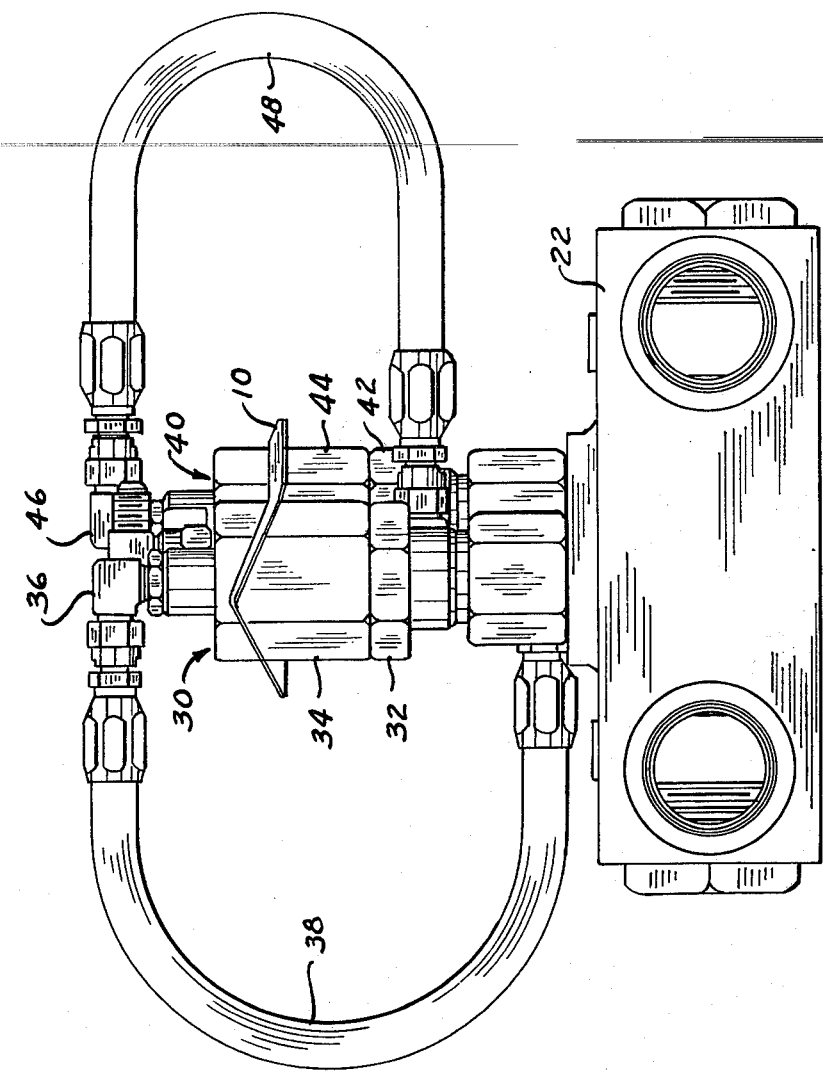
FIG. 5 is a view of the locking device in place on a valve assembly to prevent loosening of two hex head adjustable relief valves.

Referring now to the drawings and FIGS. 1 through 3 in particular, there is shown a locking device or keeper 10 constructed according to the teaching of the present invention. Keeper 10 is formed from a thin bendable sheet metal plate with an elongated opening 12 formed therein. Keeper 10 is formed from a material such as a carbon steel cold finished galvanized sheet with a thickness of 1 mm (.0359 inch). Locking device 10 has two relatively long side portions connected together by two end portions. Keeper 10 is constructed to fit around and keep in place two hex shaped relief valve adjusting heads. The elongated opening has a length defind by arrow 14 and a width, between the side portions, defined by arrow 16. Locking device 10 is formed to fit over the hex adjusting heads on the two adjustable relief valves.

Figure 6:
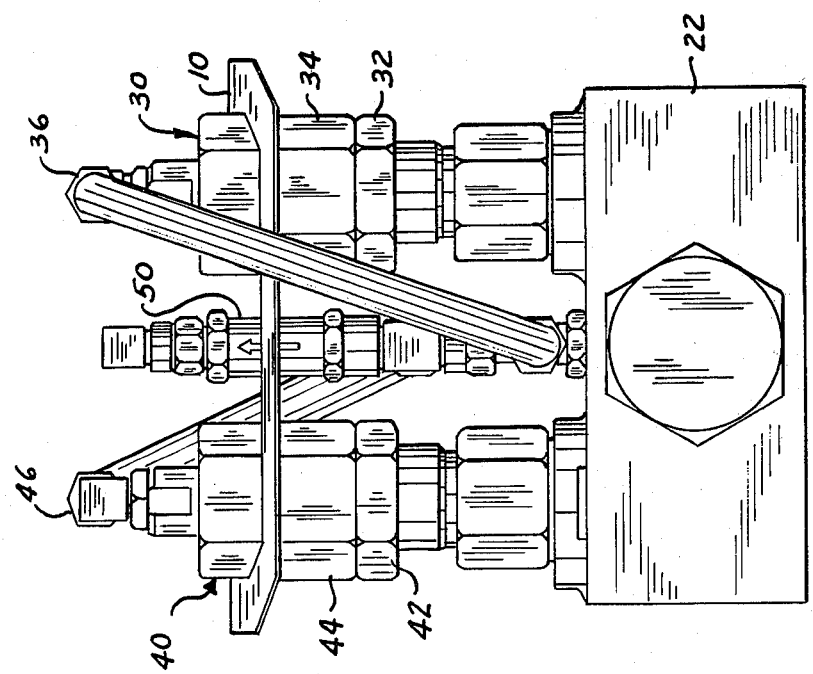
FIG. 6 is a left side view of the apparatus of FIG. 4.

Referring now to FIGS. 4 through 7 there is shown the locking device or keeper 10 utilized on a swing flow valve assembly 20. Swing flow valve assembly 20 comprises a first adjustable relief valve 30, a second adjustable relief valve 40, spaced apart from the first relief valve 30, and a check valve 50 disposed between relief valves 30, 40. Relief valves 30, 40 and the check valve 50 are supported from the swing valve body 22. Adjustable relief valve 30 comprises a locking nut 32 and a hex shaped adjusting cap 34. During operation, lock nut 32 is loosened and adjusting hex cap 34 is rotated until the desired relief pressure is set. Hex locknut 32 is then tightened into engagement with adjusting cap 34 to hold adjusting cap 34 in place. Second relief valve 40 has a locking nut 42 and a hex shaped adjusting cap 44. Relief valve 40 is adjusted as described above for relief valve 30. The pressures set by the relief valves 30, 40 are in the range of 1400 p.s.i. to 1800 p.s.i. Relief valves 30, 40 are two stage pilot operated valves. Relief valves 30, 40 have inlets 36, 46 for pilot operation. The pilot inlets 36, 46 are connected to the inlet of check valve assembly 50 by hydraulic hoses 38, 48 respectively.

In a harsh environment, the locknut 32, 42 and hex head cap 34, 44 may work loose due to vibration, shock and oil pulsation on the swing valve assembly. Keeper 10 which fits over the adjustable hex head caps 34, 44 mechanically stops relative movement thereof and prevents loosening.

The length 14 of the opening 12 in keeper 10 is greater than the outer spaced apart points on hex adjusting caps 34 and 44. The width 16 of the opening 12 in keeper 10 is made slightly greater than the distance between opposing flat parallel sides on adjusting hex cap 34, 44. That is, with keeper 10 flat, as shown in FIG. 1, it can easily fit over the hex caps 34, 44. In use, keeper 10 is bent along its longitudinal axis to reduce the separation of the side portions and the relative width of the opening 12 formed therebetween. Keeper 10 is then forced over adjustable hex caps 34, 44 so the long sides engage flat surfaces on hex caps 34, 44. This can best be seen in FIG. 3 where two opposite sides of each hex adjusting cap 34, 44 engage the longitudinal inner sides of opening 12. Keeper 10 thus tightly engages caps 34 and 44 preventing relative movement. When keeper 10 is used adjusting caps 34, 44 are positioned with their flat sides which will be engaged by one long side of keeper 10 in a common plane. This can easily be accomplished in the disclosed swing flow valve assembly since the range of adjustment is relatively great and the required additional movement to align the sides of hex caps 34 and 44 is not significant.

Referring now to FIG. 8, there is shown a keeper 110 which is different from keeper 10. Keeper 110 has two hex shaped openings 112, 114 formed therein. Hex shaped openings 112, 114 are formed to fit around the hex shaped adjusting caps 34, 44 when keeper 110 is installed on swing flow valve assembly 20. Disposed between spaced apart hex shaped openings 112, 114 is another opening 116 through which check valve assembly 50 extends when keeper 110 is in place. Keeper 110 can be formed from cold finished carbon steel sheet which is 1.6 mm (0.0598 inch) thick. Keeper 110 is bent along its longitudinal axis 118 before being installed. When keeper 110 is installed it engages and prevents relative movement of hex shaped adjusting caps 34, 44. Keeper 110 is thicker, and openings 112, 114 are shaped to provide more contact with adjusting caps 34, 44 and thus will provide a stronger retaining force than keeper 10.

Note that when keeper 10, 110 is installed it is held in place only by engaging the hex shaped adjusting caps 34, 44. No other securing device is required to maintain keeper 10, 110 in place. The keeper 10, 110 is preferably used on adjusting caps 34, 44 which are relatively long. Keeper 10, 110 is positioned along the adjusting caps 34, 44 as desired, but without any portion of keeper 10, 110 extending above or below the length of adjusting cap 34, 44. The length of adjusting cap 34, 44 is thus preferably longer than the depth of bend in keeper 10, 110.

While the disclosed invention is shown for use on a swing valve assembly having two relief valves thereon, it can be used for more than two aligned relief valves. The disclosed keepers 10, 110 can also be used on bolts or other similarly headed members to prevent relative movement therebetween. The disclosed keepers 10, 110 are inexpensive and easily assembled and have proven satisfactory in environments having high vibration, shock, and oil pulsation.

I claim:

1. A valve assembly having head adjusting caps on two spaced apart valves supported on a common body with each headed adjusting cap having two opposing flat surfaces formed thereon, the improvement comprises a locking device for preventing relative movement between the pair of adjusting caps on the spaced apart relief valves wherein said locking device comprises:

a thin sheet metal plate having an elongated opening formed therein, defining two long side portions and two end portions, for fitting over and engaging the adjusting caps to prevent relative movement, the length of said elongated opening being greater than the maximum outer separation of the adjusting caps, the width of said elongated opening, in the flat, being greater than the distance between the two flat opposing surfaces formed on one of the adjusting caps, and a bend formed in said thin sheet metal plate along its longitudinal axis so the long side portions engage the flat surface of the adjusting caps when said locking device is installed, for keeping the locking device in place.

2. A keeper as claimed in claim 1 wherein:
    the sides of said keeper are parallel.

3. A locking device as claimed in claim 2 wherein:
    the pair of adjusting caps are elongated and have a hex shape; and,
    the bend formed in said sheet metal plate has a depth less than the length of the pair of adjusting caps.

4. A valve assembly having head adjusting caps on two spaced apart relief valves supported on a common body, with each headed adjusting cap having at least two parallel spaced apart flat surfaces formed thereon, the improvement comprises:

a keeper formed from a thin sheet metal plate, having an elongated opening formed therein with a length great enough to fit over the formed adjusting head and a width slightly greater than the separation between the spaced apart flat surface on the adjusting heads, being bent along the longitudinal axis of the keeper to decrease the width of the opening formed therein and placed over the adjusting caps in engagement with the flat surfaces to prevent relative movement.

5. A method of preventing relative movement between two spaced apart headed members having a plurality of flat surfaces formed thereon comprising the steps of:

forming in a thin bendable plate an elongated opening with a length great enough to fit over the spaced apart headed members and a width greater than the width of the headed members;

aligning flat surfaces on the headed members so that at least one flat surface on one headed member lies in a common plane with a flat surface on the other headed member;

bending the plate so that the width of the formed elongated opening is less than the width of the headed member; and, placing the plate on the headed members in engagement with at least one flat surface on each headed member.

* * * * *